United States Patent [19]

Ishihara et al.

[11] Patent Number: 5,349,464
[45] Date of Patent: Sep. 20, 1994

[54] NONLINEAR OPTICAL ELEMENT

[75] Inventors: Hajime Ishihara; Yoshinori Nomura; Kikuo Cho, all of Hyogo, Japan

[73] Assignee: Mitsubishi Denki Kabushiki Kaisha, Tokyo, Japan

[21] Appl. No.: 941,730

[22] Filed: Sep. 8, 1992

[30] Foreign Application Priority Data

Sep. 11, 1991 [JP] Japan ................................. 3-231809

[51] Int. Cl.$^5$ ................................. G02F 1/37
[52] U.S. Cl. ................................. 359/240; 359/296
[58] Field of Search ................................. 359/240, 296

[56] References Cited

FOREIGN PATENT DOCUMENTS 324505 7/1989 European Pat. Off. ............. 359/240

OTHER PUBLICATIONS

"Cancellation of size-linear term ..." H. Ishihara & K. Cho, Physical Review B, vol. 42, No. 3, Jul. 15, 1990 pp. 1724–1730.
"Size dependence of X(3) in nonlocal optical media ..." H. Ishihar & K. Cho, International Journal of Nonlinear Optical Physics p. 287.
Hirschmann, E. Electo-Optic Light Modulators, NASA Technical Note TN D-3678, Nov. 1966.

Primary Examiner—Edward K. Look
Assistant Examiner—F. Daniel Lopez
Attorney, Agent, or Firm—Wolf, Greenfield & Sacks

[57] ABSTRACT

A nonlinear optical element for use in a light-light switching element or optical memory element of an optical information system which is controlled by a control light. The nonlinear optical element comprises an optical active layer having dielectric samples or semiconductor samples which cause a nonlinear optical effect, wherein their shapes and sizes are selected so that the electric field of exciton resonance energy in the sample increases in resonance with the size of the sample.

25 Claims, 9 Drawing Sheets

NONLINEAR OPTICAL ELEMENT

BACKGROUND OF THE INVENTION

1. Field of the Invention

The invention relates to a nonlinear optical element used in the optical electronics field such as an optical signal processing element or an optical memory element which can control light, and a nonlinear optical structural body which can be used as material of the nonlinear optical element and can provide a nonlinear optical effect.

2. Discussion of the Related Art

In recent years, it has been desirable to develop optically controlled optical switching elements or optical memory elements which can control an optical output by a control light for realizing an optical information transmission apparatus or optical information processing apparatus which can process a large capacity and high speed information transmission and information processing.

An effect in which optical characteristics depend on the input optical intensity is referred to as a "nonlinear" effect. In general, when the input optical intensity is small, an optical response such as a reflected light spectrum or a transmitted light spectrum does not depend on the input optical intensity. These responses are referred to as linear responses because the amount of the induced polarization is proportional to the first order of the electric field in the medium. But, if the input optical intensity becomes large, for example, when two kinds of strong and weak lights are inputted, a phenomenon occurs in which a response of the weak light is varied by the strong light and a response of the strong light is varied by its own intensity. By utilizing such phenomena, an optical response such as a reflection or a transmission is controlled by its own light or other input lights.

At present, them are several types of nonlinear optical elements or nonlinear optical structural bodies studied for light-light control systems in which the light is controlled by the light. They are, for example, elements using the nonlinear optical effect occurred by the band filling effect using transition between bands in the GaAs quantum well and so on, elements using nonlinear motion of the free carriers in the semiconductor having narrow band gap such as InSb, or excitonic resonance type of optical material using a resonance of the exciton level in the bulk semiconductor, or exciton levels confined in the semiconductor quantum wells and microcrystallites. Optical switching elements and optical bistable elements also use the above elements.

As described above, optical switches driven by light-light control or optical memories are needed for an optical information processing system which processes a large capacity of information at high speed. In these elements, an interaction amount between lights becomes a big problem for controlling or processing light signals using the light. The light having no interaction in the vacuum gives an interaction between lights via polarization of its medium. The amount of interaction is decided by an amount of the intrinsic nonlinear polarization of the medium and depends on the intensity of the light.

FIG. 14 is a conceptual figure showing an operation of a conventional nonlinear optical element. In the FIG. 10 is an optical medium which causes a nonlinear optical effect. 4 is input light provided into the optical medium 10. 5 is control light inputted into the optical medium 10. 6 is output light including input light 4 passed through the optical medium 10. The intensity of the output light 6 is obtained by modulating the input light 4 and varying intensity of the control light 5 under the nonlinear optical effect of the optical medium 10. The reflection light is also modulated in the same way, but not shown in FIG. 14.

Generally, light-light interaction is very small in natural material. In order to carry out light-light control in the optical information processing, it is necessary to have very strong intensity of the control light. There has been no suitable example of a nonlinear optical element so far which can provide the light-light control using such a weak control light intensity which is sufficiently practical. One of the most important points for manufacturing the optical electronics element is how a large nonlinear optical effect can be caused by a weak control light intensity. This gives a solution whether the actual optical electronics element can be manufactured or not.

Therefore, in order to attain the actual light-light control, material or structure having a large nonlinear optical effect must be obtained by some methods. In order to obtain these materials or the structure, the nonlinear susceptibility is enhanced by artificially producing low dimensional material or very fine structures, in which electrons are quantum-mechanically confined and the oscillator strength is concentrated on a lowest excitation level. This is a major interest for the quantum confinement effect of the electronic system.

But, in the material such as semiconductors having large interaction between atoms, a relation between the susceptibility and the actual response output is not so simple. Therefore, the amount of the nonlinear optical effect cannot be fully evaluated by only evaluating the susceptibility of the material. The above limitation has not been well recognized so far, and also the theoretical method of evaluating the nonlinear optical susceptibility has not been correctly and well understood. Therefore, there is no established principle for producing material or structural bodies having a large nonlinear optical effect. Accordingly, no practical material and no structural body having such a nonlinear optical body have been realized so far.

It is, therefore, a primary object of the present invention to provide a nonlinear optical element in which a sample size is selected so that the optical electric field, that is, the exciton polariton electric field, resonated with excitons, becomes maximum.

It is another object of the present invention to provide a nonlinear optical element having an enhanced nonlinear optical effect which operates with a remarkably weak input light or input control light.

It is another object of the present invention to provide a nonlinear optical element for use in an light-light switching element or a optical memory element of a light information system which is controlled by a control light.

SUMMARY OF THE INVENTION

According to one aspect of the present invention, a nonlinear optical element includes an optical active layer comprised of dielectric samples or semiconductor samples which cause a nonlinear optical effect, wherein their shapes and sizes are selected so that an electric field of exciton resonance energy in the above sample is enhanced in resonance with the size of the above sample to enhance the nonlinear optical effect.

According to another aspect of the present invention, a nonlinear optical element includes a plurality of optical active layers and a plurality of barrier layers, each optical active layer having dielectric samples or semiconductor samples which cause a nonlinear optical effect, wherein their shapes and sizes are selected so that the electric field of exciton resonance energy in the above sample increases in resonance with the size of the above sample to enhance the nonlinear optical effect.

According to another aspect of the present invention, a nonlinear optical element includes an optical active layer having dielectric samples or semiconductor samples, wherein a size of said optical active layer is selected to a size within the region whose center coincides with the size at which an internal electric field as a function of the size takes a peak value, and whose width is 2 times that of a full width at half maximum of this peak.

According to another aspect of the present invention, a nonlinear optical element includes a plurality of optical active layers and a plurality of barrier layers, wherein shapes and sizes of one or two directions of said optical active layer are selected to quantum-mechanically confine the relative motion of excitons so that the oscillator strength and binding energy of excitons in material become larger than those of excitons in natural material.

DETAILED DESCRIPTION OF THE PREFERRED EMBODIMENTS

Figure 1:
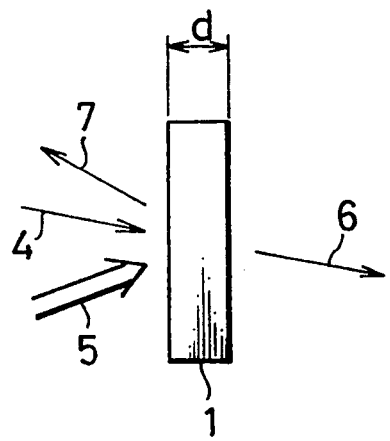
FIG. 1 is a conceptual figure showing an operation of a nonlinear optical element of a first embodiment of the present invention.

FIG. 1 is a conceptual figure showing an operation of a nonlinear optical element of a first embodiment of the present invention. In FIG. 1, 1 is a film comprised of CuCl which is nonlinear optical material, 4 is an input light, and 5 is a control light. 6 is an output light caused by the input light 4 which passes through the CuCl film 1. 7 is a reflection light which is a portion of the input light 4 reflected at the surface of the CuCl film 1. In the figure, d shows thickness of the film 1, that is, sample size.

A general explanation follows about the non-linear optical effect. The amount of the non-linear optical effect is defined by the amount of the nonlinear susceptibility referred to as nonlinear response function and electric field intensity in the material. As described above, the amount of the nonlinear optical effect is closely related with the amount of the nonlinear polarization.

In general, a component of the angular frequency $\omega$ of the polarization P at a site j which is induced by the electrical field of the light inputted into the material, is written by the expansion of the power series of the internal electrical field as shown in a below equation (1).

$$p_j(\omega) = \sum_l \chi^{(1)} F_l(\omega) + \quad (1)$$

$$\sum_{lm} \sum_{pq} \chi^{(2)}_{jlm}(\omega = \omega_p + \omega_q) F_l(\omega_p) F_m(\omega_q) +$$

$$\sum_{lmn} \sum_{pqs} \chi^{(3)}_{jlmn}(\omega = \omega_p + \omega_q + \omega_s) F_l(\omega_p) F_m(\omega_q) F_n(\omega_s)$$

where, $\omega_p$, $\omega_q$, $\omega_s$ are angular frequencies of the input light, j, l, m, n are indices of the lattice site. For simplifying the explanation, the deviation light is fixed by one plane. $\chi$ is a response coefficient for the input light which is determined only by the material property, for example CuCl in this case, and referred to as optical response function or optical susceptibility. On the other hand, F shows electric field of exciton polariton in the media, namely internal electric field, which is a coupled wave of input light in the media and induced polarization wave.

When the input light intensity is small, the higher order term of the internal electric field can be neglected and the induced polarization is proportional to the first order of the internal electric field. This is referred to as a linear response. But, when the input light intensity becomes larger, a component proportional to the higher order of the internal optical electric field can no longer be neglected, and then the output light intensity is not proportional to the input light intensity due to the influence of the nonlinear effect. The second and subsequent terms in the equation (1) show components of the nonlinear polarization. The second term shows nonlinearity which is strongly present in the material having no inversion symmetry. In case of normal isotropic material, the third term becomes the largest nonlinear term.

In the material in which the interaction can not be neglected between atoms, the optical susceptibility χ and the internal electric field are generally functions of the coordinate, and its amount is defined at each coordinate site. Especially, the susceptibility is defined by a plurality of coordinates. This means that an induced polarization at one point is affected by the internal optical electric field from all other points. Such a response is referred to as a non-local response. For example, the third-order nonlinear susceptibility is a function of four coordinates and the third-order nonlinear polarization at the site j is affected by the plural modes of electric field at all sites of the crystal. The effect of the non-local response plays an essential roll for enhancement the effect of the internal electric field.

In case of isolated atoms or molecules, or material constructed of non-interacting atoms or molecules, the amount of nonlinear optical effect per unit volume does not depend on a size or a shape of the sample. But, in case of the system in which collected atoms are not isolated from each other but have a relation via the electronic interaction, such as semiconductor or dielectric media like CuCl in this embodiment, the amount of nonlinear optical effect is affected by various sizes or shapes of the sample due to the following two reasons.

The first reason is that the amount of the nonlinear optical susceptibility of such system depends upon a size of the sample. The second reason is that the amount of the internal electric field of exciton polariton is peculiarly enhanced in resonance with the sample size according to the interference effect. If the size and the shape of the sample are controlled so that the above two effects are to be used effectively, a large nonlinear optical effect can be obtained which could not be obtained in the past.

The following is a detailed explanation of sample-size dependence of an amount of the nonlinear optical response function and the internal electric field using the example of the third-order nonlinear optical effect. The former is explained in the paper by H. Ishihara and K. Cho, Physical Review B Vol. 42, p 1724 (1990), and H. Ishihara and K. Cho, International Journal of Nonlinear Optical Physics (World Scientific), Vol. 1, p 287 (1992).

At first, the sample size dependence of the third nonlinear optical susceptibility is explained here. This dependence is decided for a certain input light energy by the amount of jumping probability of the excitation between the atoms (amount of the transfer energy) which are proper to the material, and by the length of the life time of the excitation state of the crystal. In the optical effect of the excitonic system, the polarization is carried by the excitons, where the exciton is a complex particle in which excited electrons and remaining holes are bound each other by the Coulomb force and a quantum state which exists as a lowest excitation state of the crystal. There are two kinds of excitons, one of them is a Frenkel exciton, where excited electrons and holes exist on the same atom, having no internal degree of freedom. Another is a Wannier exciton where excited electrons and holes can exist on different atoms. The Frenkel exciton is used in order to simplify the explanation when the concrete expression of exciton is necessary. But a result is obtained as a general form which can be applied to the case where the exciton has a degree of freedom of the relative motion.

The third-order nonlinear optical process of the exciton system generally consists of the following two processes.

(1) produce one-exciton→annihilate it and return to the ground state→produce another exciton→annihilate another exciton and return to the ground state again.

(2) produce one-exciton→produce another exciton to provide a state having two-excitons→annihilate one-exciton and return to one-exciton state→annihilate another exciton and return to the ground state.

The former process is referred to as $A_0$ process and the latter process is referred to as $A_2$ process. The linear response only relates to a process in which one-exciton is produced and then annihilated.

Two kinds of sixteen terms in total, which show the above two processes, are obtained by the calculating the third-order nonlinear susceptibility using the perturbation expansion method of the density matrix which is well established in the quantum mechanics. In the process $A_0$, an amount of response is proportional to the fourth power of transition dipole moment between the ground state and the exciton state. This is clearly understood by concretely expressing one of the terms showing the process using the perturbation expansion of the density matrix.

For example, one of the terms of $A_0$ is proportional to the following expression (2).

$$\sum_\lambda \sum_\mu \frac{<0|P|\lambda><\lambda|P|0><0|P|\mu><\mu|P|0>}{(E_\lambda - \omega_p - \omega_q - \omega_s - 3i\gamma)(-\omega_q - \omega_s - 2i\gamma)(E_\mu - \omega_s - i\gamma)} \quad (2)$$

The summation of λ, μ shows that this term includes a sum of many processes relating various quantum states, where, $|\lambda>$ is one-exciton state having quantum number λ, $|0>$ is ground state, P is a dipole operator of the crystal, $E_\lambda$ is an eigenenergy of state $|\lambda>$, and $\omega_p$, $\omega_q$, $\omega_s$ are angular frequencies of the input lights. γ is a factor of adiabatic switching of the interaction between electrons and lights. A value which the Plank constant is divided by 2π, is taken to be unity, and hereafter it is followed. $<0|P|\lambda>$ in the numerator is a matrix element of the transition dipole moment. The square of the absolute value of $<0|P|\lambda>$ depends on the space volume occupied by the exciton wave function of the state $|\lambda>$. Since the exciton wave function in a system having energy transfer is spread in whole crystal, the above amount increases in proportion to the increase in volume.

A more detailed explanation is given below. For example, the Frenkel exciton confined in the thin film having a z axis is expressed by equation (3) using the excitation state $|l_x l_y n)$ localized at the lattice site ($l_x$, $l_y$, n)

$$|K_x K_y k> = \frac{1}{\sqrt{N_x N_y N_z}} \sum_{l_x l_y} \sum_n \exp(iK_x l_x)\exp(iK_y l_y)\sin kn |l_x l_y n), \quad (3)$$

then, the expression of $<0|P|K_x K_y k>$ is obtained as $$(\sqrt{N_x N_y} / \sqrt{N_z}) M \delta_{k_{xo}} \delta_{k_{yo}} \sum_n \sin kn, \quad (4)$$

where, $|K_x K_y k>$ is a Frenkel exciton state having a wave number ($K_x$, $K_y$) which is parallel to the surface of thin film and a wave number k which is perpendicular to the surface. $N_x$, $l_x$ are the number of atoms and an index of the atom site in the line along x direction on the surface, respectively. $N_y$, $l_y$ are the number of atoms and an index of the atom site in the line along y direction on the surface, respectively. $N_z$, n are the number of atoms and an index of the atom site along z-axis, respectively. The 4th power of the value calculated above is in proportion to the square of the sample volume. Therefore, the $A_0$ per unit volume has an amount in proportion to the volume of the sample. On the other hand, the contributions of the process of $A_2$ have the opposite sign to the process of $A_0$.

In the system having no energy transfer and no dispersion of excited energy, the exciton wave function is localized on the atom and any exciton on every atom has the same resonance energy. If double excitations on the same atom is allowed, the contribution of the process $A_0$ and $A_2$ is completely canceled. But, since double excitations cannot actually exist by the Pauli exclusion principle, there arises a difference of the degrees of freedom between the two kinds of processes, and cancellation becomes incomplete. As a result, an amount of contribution is the same as that of the isolated atom multiplied by a density of atom, and has no dependence on the sample size.

But, in the system having finite transfer energy, the exciton state forms a band and causes the energy to disperse on the band. And since the energy of the state having two-excitons is also dispersed on the band in the same way, the energy differences between lowest one-exciton state and two-excitons states shift from that between ground state and lowest one-exciton state. When the band width is large, and the sample size is so small that the number of exciton states is small, and the amount of above mentioned shift is large. In this case, the cancellation hardly occurs. As long as the state is maintained, the contribution of each process increases along with the volume at a separate energy site, and the amount of the nonlinear optical effect per unit volume is proportional to the sample size.

But, when sample size becomes large and a state having two-excitons is filled densely in a certain bandwidth, the drift of the resonance site between the two kinds of processes becomes small and cancellation occurs between these processes. It depends on the width of each resonance peak and to what extent the cancellation occurs. That is, the overlapped part of the energy and the extent of the cancellation become greater as the peak width becomes larger. Since the width of the resonance peak is inversely proportional to the life time of the excitation state, the cancellation becomes harder to achieve as the life time is longer. If the sample size becomes still larger, the enhancement of whole nonlinear susceptibility by its volume is saturated and becomes a constant value after the value reaches a maximum value. To know what extent is the nonlinear susceptibility continuously enhanced with the increase of the sample size is very important for estimating the amount of the nonlinear optical effect. This is, as easily seen from the above description, determined by the parameters corresponding to the material such as the amount of transfer energy which defines the band width and the lifetime of the excitation which defines a width of the resonance peak.

The above is summarized as follows. That is, the whole value of the third-order nonlinear susceptibility increases in proportion to the sample size when the sample size is small, then its value is saturated by cancellation and becomes a constant value. If the above is reversely expressed, the larger the transfer energy is, the greater the sample size region is where the nonlinear susceptibility increases according to the increase of the sample size. Further, the longer the lifetime of the excitation state is, the stronger the tendency is. Further, since the transfer energy is inversely proportional to the effective mass of the exciton, the size dependence in relation to the parameter of effective mass can be discussed in the similar way.

The detailed mechanism of the nonlinear optical effect described above becomes apparent from the theoretical calculation using the perturbation expansion method of the density matrix of the quantum mechanics.

A detailed calculation is described in the following. From the result of the calculation by the density matrix method, the third-order nonlinear polarization on the lattice site j, is written as, $$P_j^{(3)} = \sum_{lmn} \sum_{pqs} e^{-i(\omega_p+\omega_q+\omega_s+3i\gamma)t} \chi_{jlmn}^{(3)}(\omega_p, \omega_q, \omega_s) \times F_l(\omega_p)F_m(\omega_q)F_n(\omega_s) \quad (5)$$

where, $F_n(\omega_s)$ is the amplitude of the light electric field having frequency $\omega_s$ on the lattice site n. For simplifying the explanation, the light polarization is fixed to a certain direction.

$\omega^{(3)}j$ 1 mn $(\omega_p,\omega_q,\omega_s)$ is a site represented third-order nonlinear susceptibility, and the details are obtained from the following expression (6).

$$\chi_{jlmn}^{(3)}(\omega_p, \omega_q, \omega_s) = \quad (6)$$

$$(1/v_0) \sum_\lambda \sum_\mu \sum_\nu \Bigg( \frac{<0|P_j|\lambda><\lambda|P_l|\mu><\mu|P_m|\nu><\nu|P_n|0>}{(E_{\lambda o} - \Omega'_3)(E_{\mu o} - \Omega'_2)(E_{\nu o} - \omega'_s)} +$$

$$\frac{<0|P_n|\lambda><\lambda|P_l|\mu><\mu|P_j|\nu><\nu|P_m|0>}{(E_{\nu\mu} - \Omega'_3)(E_{\nu\lambda} - \Omega'_2)(E_{o\lambda} - \omega'_s)} +$$

$$\frac{<0|P_n|\lambda><\lambda|P_m|\mu><\mu|P_j|\nu><\nu|P_l|0>}{(E_{\nu\mu} - \Omega'_3)(E_{o\mu} - \Omega'_2)(E_{o\lambda} - \omega'_s)} +$$

$$\frac{<0|P_m|\lambda><\lambda|P_l|\mu><\mu|P_j|\nu><\nu|P_n|0>}{(E_{\nu\mu} - \Omega'_3)(E_{\mu\lambda} - \Omega'_2)(E_{\nu o} - \omega'_s)} +$$

$$\frac{<0|P_n|\nu><\nu|P_m|\mu><\mu|P_l|\lambda><\lambda|P_j|0>}{(E_{\lambda o} + \Omega'_3)(E_{\mu o} + \Omega'_2)(E_{\nu o} + \omega'_s)} +$$

$$\frac{<0|P_m|\nu><\nu|P_j|\mu><\mu|P_l|\lambda><\lambda|P_n|0>}{(E_{\nu\mu} + \Omega'_3)(E_{\nu\lambda} + \Omega'_2)(E_{o\lambda} + \omega'_s)} +$$

$$\frac{<0|P_l|\nu><\nu|P_j|\mu><\mu|P_m|\lambda><\lambda|P_n|0>}{(E_{\nu\mu} + \Omega'_3)(E_{o\mu} + \Omega'_2)(E_{o\lambda} + \omega'_s)} +$$

$$\frac{<0|P_n|\nu><\nu|P_j|\mu><\mu|P_l|\lambda><\lambda|P_m|0>}{(E_{\nu\mu} + \Omega'_3)(E_{\nu\lambda} + \Omega'_2)(E_{\nu o} + \omega'_s)} \Bigg)$$

where, $v_0$ is a volume of unit a cell, $P_j$ is a polarization density operator at lattice site j. $E_\xi$ is an eigenenergy at the state $|\xi>$ where there is no external field, and obtained from following equations.

$$E_{\xi\eta} = E_\xi - E_\eta \quad (7)$$

$$\Omega'_3 = \omega_p + \omega_q + \omega_s + 3i\gamma \quad (8)$$

$$\Omega'_2 = \omega_q + \omega_s + 2i\gamma \quad (9)$$

$$\omega'_s = \omega_s + i\gamma \quad (10)$$

|λ⟩, |ν⟩ in the expression (6) take the place of one-exciton state, and |μ⟩ takes the place of a state having two-excitons or a ground state. By substituting the eigenfunction and eigenenergy of this one-exciton state and the state having two-excitons into the above expression according to the handling system, the concrete expression of the nonlinear susceptibility is obtained.

The nonlinear susceptibility which is calculated in this way is a function of four coordinates. In usual case, this is evaluated with use of so-called long wavelength approximation, where the site dependence of the electric field is omitted. As a result of this approximation, the site dependence of nonlinear susceptibility is removed. Though this approximation is used in the following explanation, the conclusion is quite general. Under the long wavelength approximation, the third-order nonlinear polarization is expressed as, $$P^{(3)} = \sum_{pqs} e^{-i(\omega_p + \omega_q + \omega_s + 3i\gamma)t} \chi^{(3)}(\omega_p, \omega_q, \omega_s) F(\omega_p) F(\omega_q) F(\omega_s) \quad (11)$$

where, the site dependence of the nonlinear susceptibility disappears.

In the following simplest example, the exciton state is calculated in the model having one-dimensional energy transfer. Then the amount of the third-order nonlinear susceptibility is concretely calculated when the incident light beam resonates with the energy of lowest one-exciton state.

In the following example, a pump-probe measurement, in which the intensity of the weak probe light (signal light) is controlled by the strong pumping light (control light), is considered. That is, the pumping light frequency and the probe light frequency are substituted into the frequencies $\omega_p$, $\omega_q$, $\omega_s$ of the electric field. The eigenfunction and eigenenergy of the one-exciton state and the state having two-excitons are calculated in case of the Frenkel excitons on the one-dimensional periodic lattice. The above is the simplest example. But, the present discussion on the sample-size dependence of the third-order nonlinear susceptibility, that is, the enhancement and succeeding saturation of $\chi^{(3)}$ with increase of the sample size does not depend on the model. If it is necessary to obtain a quantitative and accurate result in an actual system, the exciton state of the handling system can be calculated analytically or numerically.

In the Frenkel exciton system on the one-dimensional periodic lattice, the eigenenergy and the eigenfunction are obtained as, $$E_1(k) = \epsilon_o - 2b\cos k \quad (12)$$

$$|k\rangle = (1/\sqrt{N}) \sum_l \exp(ikl)|l\rangle, \quad (13)$$

respectively,
where, $\epsilon_o$ shows energy when the excitation is localized on the lattice site,
b shows transfer energy, N is the number of lattice, and |l⟩ shows an excitation state which is localized on the lattice site l. The allowed values of the wave number k are $$K = 2n\pi/N, \{n=1,2\ldots,N\}. \quad (14)$$

On the other hand, in case of considering the Pauli exclusion principle in which double excitations on the same site cannot actually be allowed, a state having two-excitons is specified by the two quantum numbers corresponding to the wave number of the center-of-mass motion and wave number of relative motion.

The eigenenergy and the eigenfunction are obtained as, $$E_2(K, \kappa) = E_1(K + \kappa) + E_1(K - \kappa), \quad (15)$$

$$|K, \kappa\rangle = (2/N) \sum_l \sum_{m(<l)} \exp[ik(l + m)]\sin(\kappa|m - l|)|l, m\rangle, \quad (16)$$

respectively,
where, |l, m) shows a state where the excitation exists at l, m sites. The allowed values of wave number K, κ are determined as follows. When N is an odd number:

$$(K,\kappa) = \{2\overline{m},(2n-1)\}\pi/N, \{m=1,2,\ldots,N, n=1,2,\ldots,(N-1)/2\} \quad (17)$$

When N is an even number:

$$(K, \kappa) = \{m, (2n - 1)\}\pi/N, \quad (18)$$
$$\{m = 2, 4, \ldots, N, n = 1, 2, \ldots, N/2\}$$
$$= (m, 2n)\pi/N,$$
$$\{m = 1, 3, \ldots, N - 1, n = 1, 2, \ldots, N/2 - 1\}$$

Figure 2:
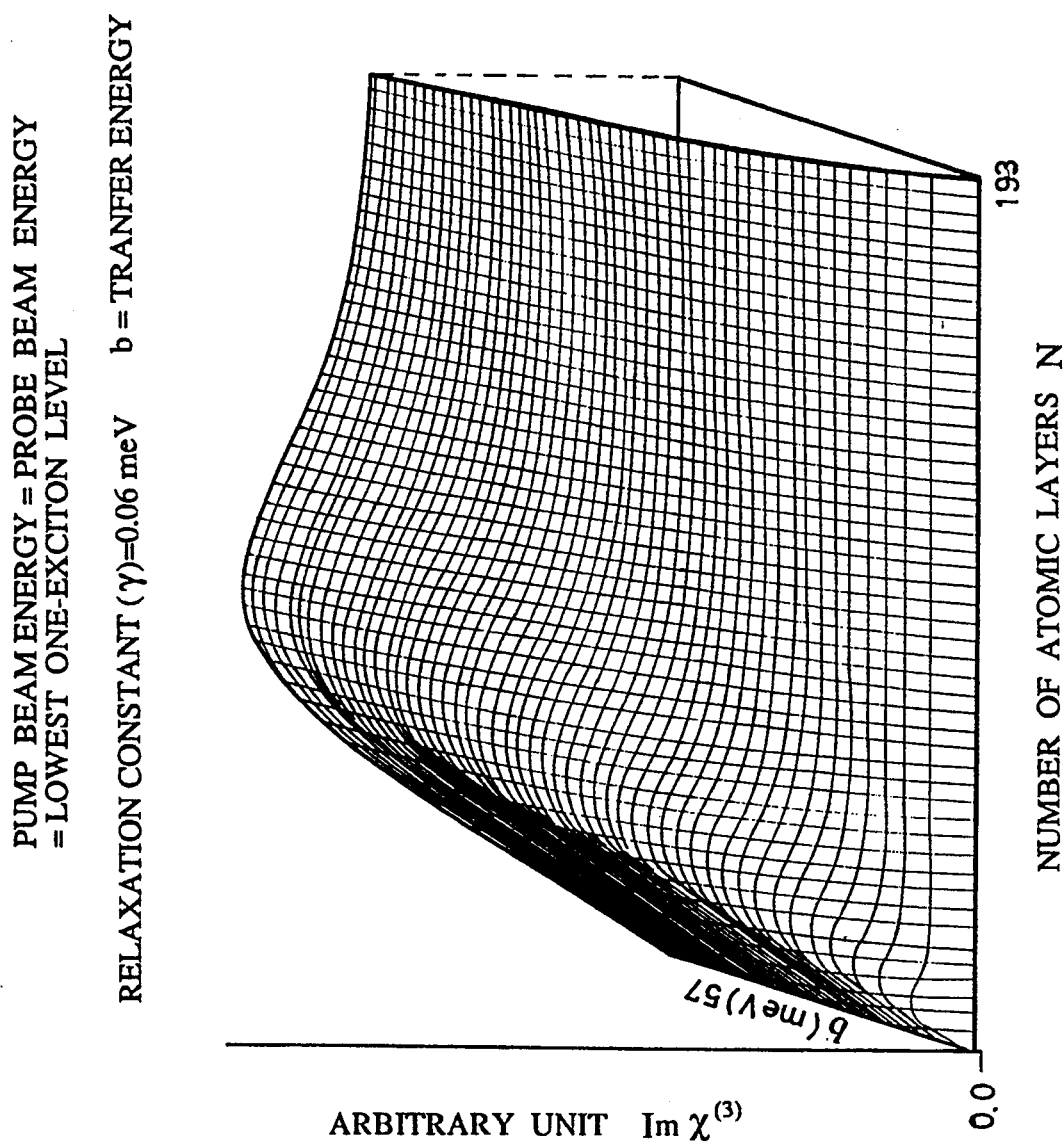
FIG. 2 shows a function of an amount of imaginary part of the third-order nonlinear susceptibility corresponding to the amount of the sample size and the amount of the transfer energy in the model.

FIG. 2 shows an imaginary part of the third-order nonlinear susceptibility as a function of the sample size N and transfer energy b in the above model. In this case, both the pumping light and the probe light are tuned with lowest one-exciton resonance energy, and also the internal electric field is approximated as having no dependence on site (long wavelength approximation). It is easily understood from FIG. 2, the third-order nonlinear susceptibility becomes larger, at the site of fixed transfer energy, in proportion to the sample size within the limited sample size area then the amount becomes a constant value after reaching a maximum peak value.

The sample size area where $\chi^{(3)}$ shows enhancement is determined by the amount of the transfer energy and the lifetime of the excitation state. That is, the greater the transfer energy becomes and the longer the lifetime becomes, the larger the area where the third-order susceptibility is enhanced in proportion to the sample size becomes. In the above calculation, the lifetime is introduced by treating a factor γ of the adiabatic switching used for interaction between the electron and the light as a finite value.

In case of CuCl of the present embodiment, the transfer energy and the typical relaxation constant (inverse number of the lifetime) are estimated as 57 meV, 0.06 meV, respectively, from the parameters known by the experiment. By substituting these values in the above expressions, the third-order nonlinear susceptibility (per unit volume) of the present model is about 60 times at the maximum site compared with the case of one atom. This occurs when the number of atomic layers N=82.

Next, the singular enhancement effect of the internal electric field intensity is explained using the size resonance enhancement effect of the exciton polariton in the thin film structure in FIG. 1 as an example.

In general, when the light having energy resonated within the exciton inputs into the material, a coupled wave is generated by the external field inputted into the material and the polarization wave generated by the exciton. This is referred to as an exciton polariton. The internal electric field of the system is generated by this exciton polariton.

Figure 3:
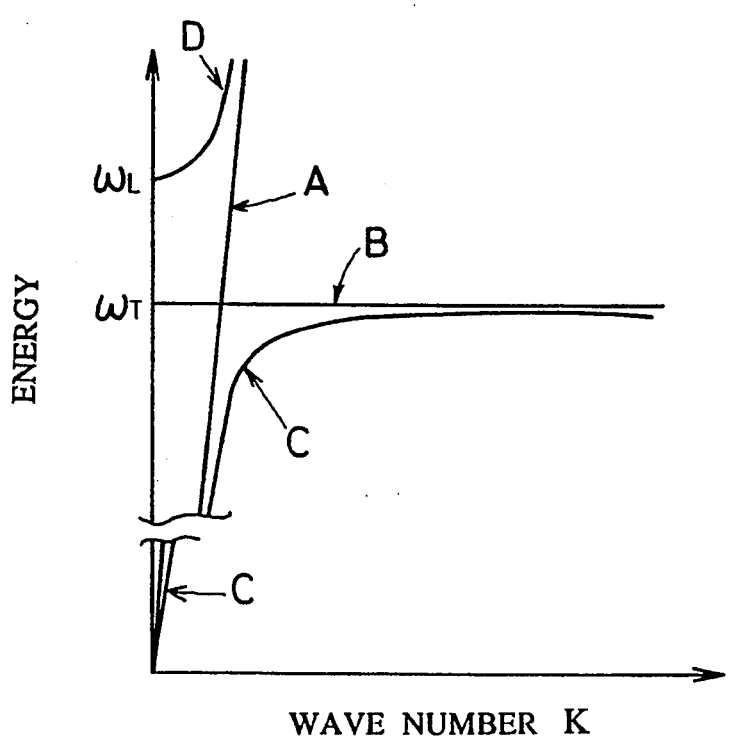
FIG. 3 shows characteristics of polariton energy dispersion where there is no energy transfer in the material.

FIG. 3 shows characteristics of a polariton energy dispersion where there is no energy transfer in the material.

Figure 4:
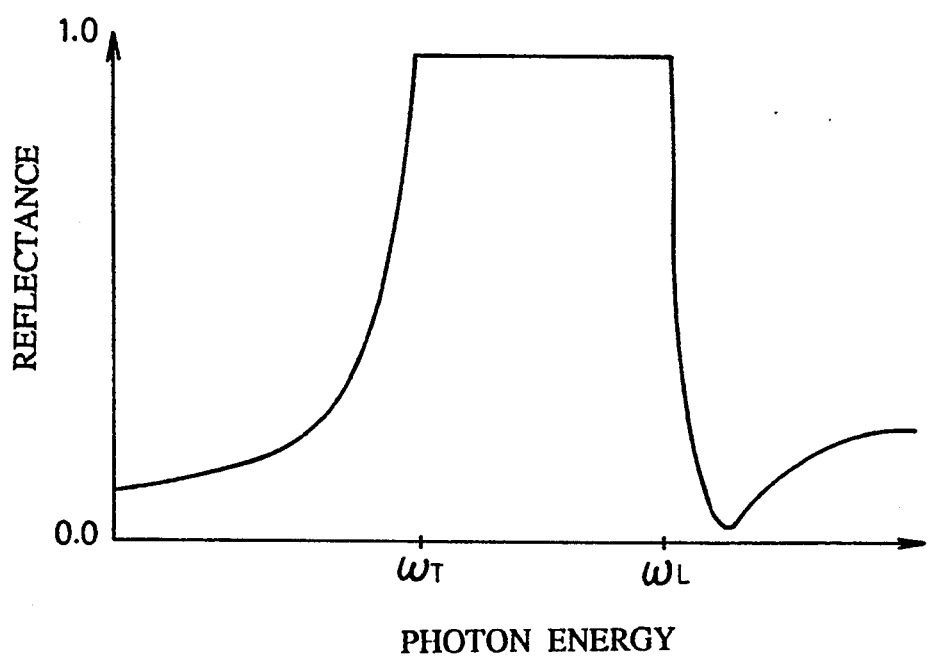
FIG. 4 shows characteristics of reflection factor spectrum distribution near the exciton resonance area where there is no energy transfer in the material.

FIG. 4 shows characteristics of a reflection spectrum near the exciton resonance region where there is no energy transfer in the material.

In FIG. 3, A is a dispersion curve of light, B is a dispersion curve of the exciton, C is a dispersion curve of the polariton (lower branch), and D is a dispersion curve of the polariton (upper branch). $\omega_L$ is the energy of a longitudinal wave, and $\omega_T$ is the energy of a transversal wave.

As seen in FIG. 3 and FIG. 4, where no energy transfer exists, there is generally an energy area where there is no light mode over the resonance energy $\omega_T$. At this area, the light cannot enter into the crystal material and the light totally reflects at its surface. When there exists a relaxation mechanism of the excitation energy, a very small amount of light can enter into the crystal material and its amplitude is very small. In this case, internal electric field with the resonance energy becomes a certain amount of intensity when the sample is very thin such as a film including a few atomic layers. But, the film thickness becomes thicker, and the intensity rapidly decreases to a small value. For example, assuming that the thin film has a resonance energy of CuCl and is formed of material having zero transfer energy, the average internal electric field intensity over the layers is 0.0006 in the case that the intensity of the incident light is unity and the relaxation constant is 0.06 meV, and the film thickness is 52 atomic layers (about 280 Å).

Figure 5:
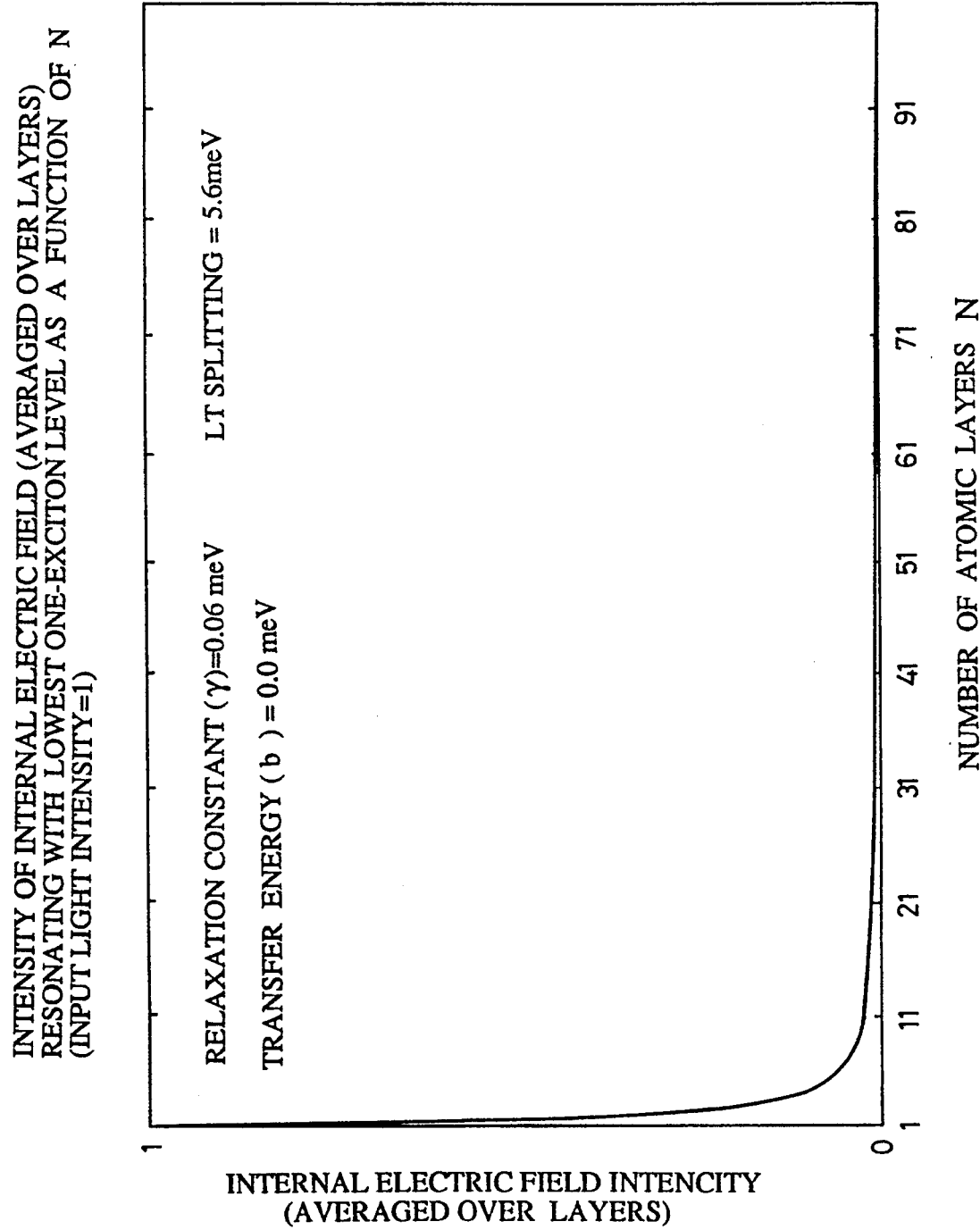
FIG. 5 shows an internal electric field which is a function of film thickness when assuming the transfer energy of CuCl is 0.

FIG. 5 shows an average intensity of internal electric field over the layers which is a function of film thickness assuming that the transfer energy of CuCl is 0.

In fact, there exists energy transfer in the material such as CuCl. In such a case, the dispersion relation of the polariton differs from the above case, and the electromagnetic wave mode exists in the resonance energy area. This case is shown in FIG. 6.

Figure 6:
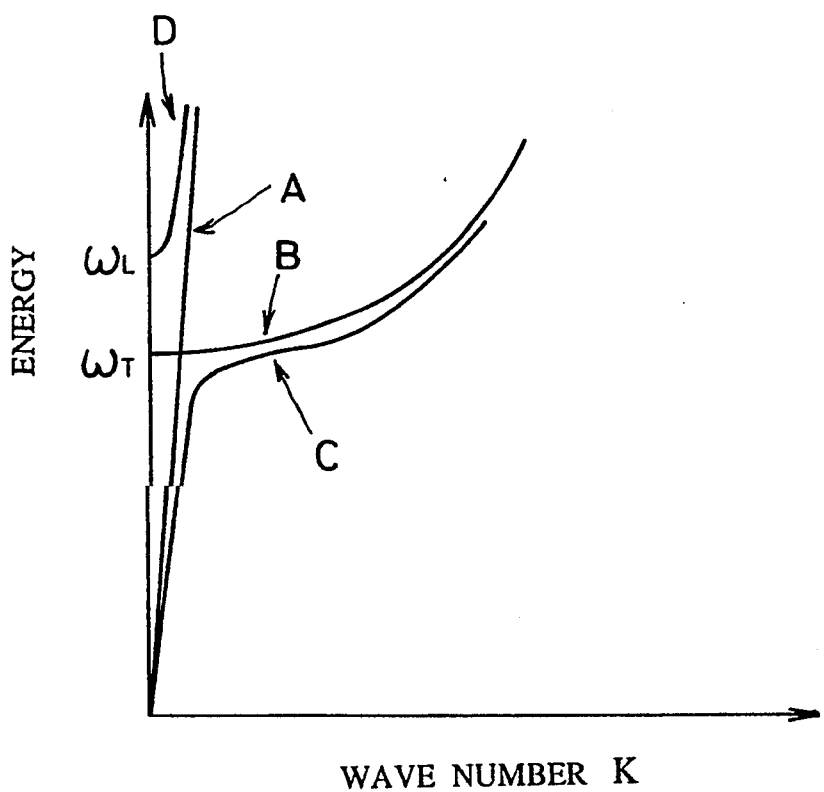
FIG. 6 shows energy dispersion of polariton in relation to light and exciton when the energy transfer is finite.

FIG. 6 shows energy dispersion of polariton when the energy transfer is finite. In the figure, notations are the same as those in FIG. 3 and FIG. 4.

The exciton polariton wave causes a similar interference effect as the Fabry Perot type of interference effect in the thin film. As seen from FIG. 6, in the resonance energy area, the wavelength of the electromagnetic wave is very small compared with normal light, thus a special interference effect is caused. As a result of the interference effect, the reflectance happens to be very small even for the input light with the resonance energy for some special sample thickness. For the above case, the exciton polariton resonates with sample size and its amplitude is singularly enhanced.

Figure 7:
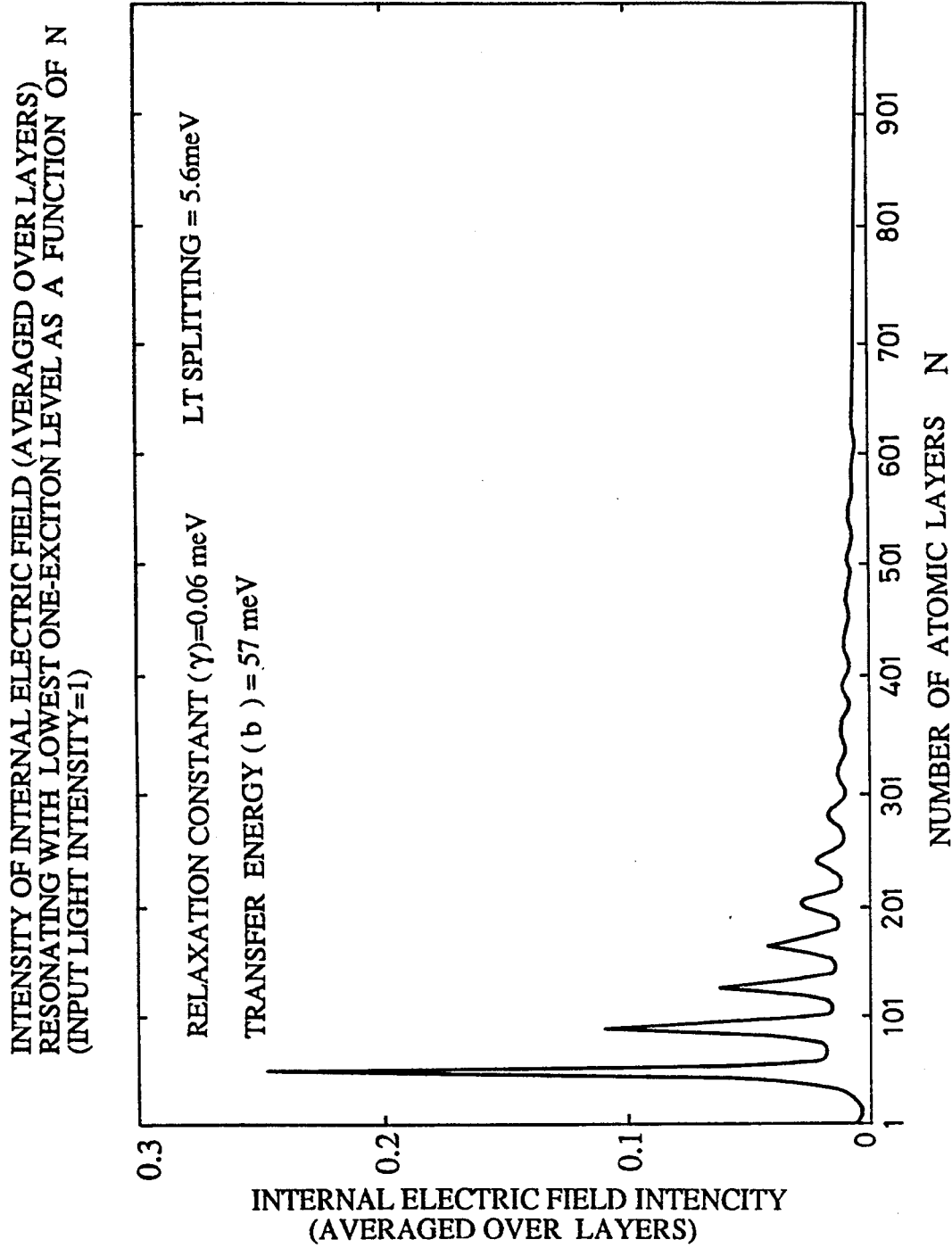
FIG. 7 shows characteristics of internal electric field intensity against the film thickness in CuCl thin film.

FIG. 7 shows an film-thickness dependence of a internal electric field intensity obtained by calculation for the case of CuCl. In the figure, LT splitting is the value which is proportional to the transition dipole moment per atom. The vertical axis shows the internal electric field intensity normalized by the input light intensity, and the horizontal axis shows the size of the thin film, that is, the film thickness. The first peak value is 0.248 in case of CuCl, which is 80 times larger compared with the value near 12 atomic layers where the resonant enhancement does not take place.

The above result is obtained from the following theoretical calculation. At first, the eigenenergy and eigenfunction in the absence of the external light are obtained by considering the energy transfer effect of the system by the quantum mechanics calculation. Then, using the above result, a linear susceptibility is obtained as a function of two coordinates from the following expression (19) by the linear response theory.

$$\chi^{(1)}(R, R'; \omega) = (1/v_o) \sum_\lambda \left[ \frac{<0|P(R)|\lambda><\lambda|P(R')|0>}{E_\lambda - \omega - i\gamma} + \frac{<0|P(R')|\lambda><\lambda|P(R)|0>}{E_\lambda + \omega + i\gamma} \right] \quad (19)$$

where, R is a coordinate which indicates a site of the cell, P(R) is a polarization density operator at a point R, and $\lambda$ is a quantum number indicating an excitation state of the system having excitation energy $E_\lambda$. $|\lambda>$ shows its quantum state, and $|0>$ shows ground state.

For example, in case of Frenkel exciton confined in a thin film, a wave function is expressed by the equation (3), and the eigenenergy is expressed by the equation (12) when the kinetic energy parallel to the thin film is to be 0. The susceptibility factor is expressed by the function of two coordinates, because the nonlocal response is considered where the polarization at one site is induced not only by the electric field on the same site, but also by that on other sites.

At last, the electric field in material is obtained by solving the following Maxwell equation (20), containing this nonlocal susceptibility as a integral kernel.

$$rotrotF(R) - (\omega^2/c^2)F(R) - (4\pi\omega^2/c^2) \int dR' \omega^{(1)}(R,R';\omega)F(R') = 0 \quad (20)$$

In case of normal incident of light into the thin film consisting of the discrete lattice and having N atomic layers, the electric field is concretely calculated as, $$F(l) = \sum_{j=1}^{2} \{F_j e^{ik_j l} + \overline{F}_j e^{ik_j(N+1-l)}\}, \quad (21)$$

where, $\{F_j, \overline{F}_j\}$ are arbitrary constants, and wave numbers $\{k_j\}$ are the roots of the polariton dispersion relation shown in the following equation (22).

$$(2\cos k - 2\cos q)(\omega + i\gamma - \epsilon_o + 2b\cos k) - \quad (22)$$

$$a_0^2 \frac{4\pi\omega^2}{c^2} \frac{|M|^2}{v_o} = 0$$

where, $$q = a_0 \frac{\omega}{c} \sqrt{\epsilon_b} \quad (23)$$

and $a_0$, $\epsilon_b$ are lattice constant and background dielectric constant, respectively, and M is the transition dipole moment per atom.

The additional boundary conditions, which define relations between an arbitrary constants $\{F_j, \overline{F}_j\}$ at the same time as solving the Maxwell equation, is obtained as, $$\sum_{j=1}^{2} \frac{F_j + \overline{F_j} e^{ik_j(N+1)}}{\omega + i\gamma - \epsilon_0 + 2bcosk_j} = 0 \quad (24)$$

$$\sum_{j=1}^{2} \frac{F_j e^{ik_j(N+1-l)} + \overline{F_j}}{\omega + i\gamma - \epsilon_0 + 2bcosk_j} = 0 \quad (25)$$

By connecting the internal light with an outside light using the above equations and Maxwell boundary condition, that is, the continuity condition between electric field and magnetic field at the boundary, the value of the unfixed constants such as $\{F_j, \overline{F_j}\}$ can be determined, and thus the internal electric filed intensity is obtained.

In the past, there is no example in which an internal electric field of the excitonic system is calculated by using the similar method as described above. The theory explained above is described in detail in the references, K. Cho and M. Kawata; J. Phys. Soc. Japan, vol. 54 (1985), p 4431, and K. Cho and H. Ishihara: J. Phys. Soc. Japan, vol. 59 (1990), p 754.

Since the above calculated result is obtained by a linear optical response theory, deviation of an internal electric field, which is generated by the nonlinear optical effect and exists at an actual nonlinear optical response, is not included in the above result. FIG. 7 shows such a calculated result without considering the nonlinear optical effect. However, the deviation of the internal electric field intensity by the nonlinear optical effect is not so large that it gives qualitative changes to the above explanation. Accordingly, this deviation can be neglected.

As described above, by using the sample size dependence of the third-order nonlinear susceptibility and the size resonance enhancement effect of the internal electric field, the nonlinear optical effect of the medium can be drawn maximally. That is, as described above, in the material having large transfer energy, the third-order nonlinear optical susceptibility becomes larger in comparison with the material having zero transfer energy when its sample size becomes larger. For example, in case of CuCl, the value reaches up to 60 times. But, if in the case that the size resonance enhancement of internal field does not occur, the enhancement of nonlinear susceptibility is not made the best use of. For example, if CuCl thin film having thickness of 20 atomic layers ( about 108 Å) is selected, since the internal electric field is not enhanced as seen from FIG. 7, the size enhancement effect of the nonlinear optical susceptibility is not used effectively, and a large nonlinear optical effect can not be obtained.

In case of obtaining large nonlinear optical effect by enhancing the oscillator strength by confining the electronic system, sometimes small sample size is apt to be selected. But, as is easily understood from the above description, while the sample size becomes small, the remarkable nonlinear optical effect cannot be obtained unless the sample size is selected so that the size resonance enhancement of the internal field occurs. If a larger sample size is selected, for example, film thickness having 1000 atomic layers (about 5400 Å) of CuCl thin film, the remarkable nonlinear optical effect cannot be obtained since the internal electric field intensity is very small as seen in FIG. 7.

But, if a film thickness having 52 atomic layers (about 280 Å) is selected as shown in FIG. 7, a very large nonlinear optical effect can be obtained compared with the case of having no resonance enhancement since the size resonance enhancement of the internal electric field occurs. If the sample size is in accordance with the area where the value of the nonlinear susceptibility becomes maximum, the nonlinear part of signal intensity of the output light will increase more than 2~3 digits compared with the case When resonance enhancement of the internal electric field does not occur at micro size.

Figure 8:
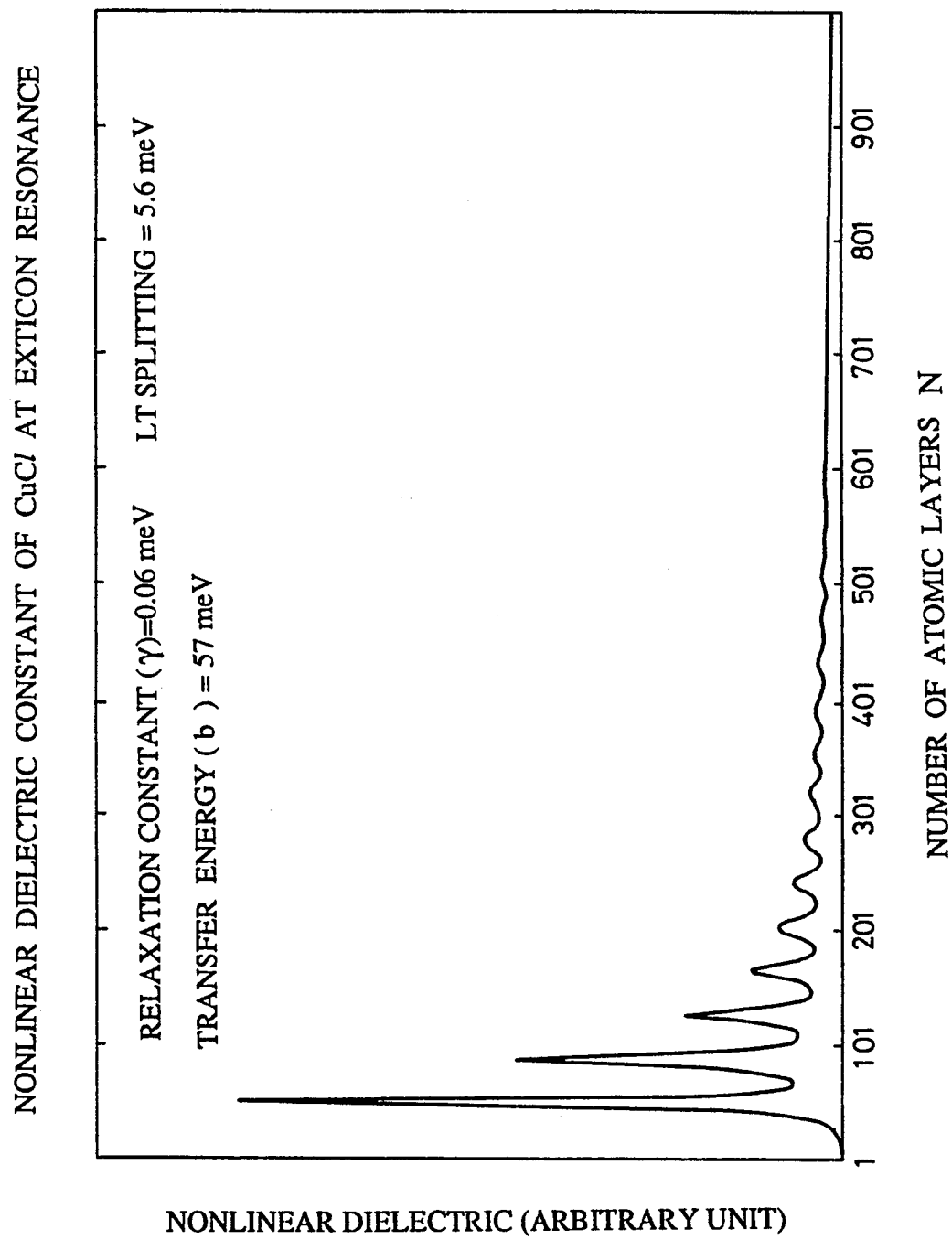
FIG. 8 shows characteristics of nonlinear dielectric constant which is calculated by multiplying internal electric field by nonlinear susceptibility against the film thickness.

FIG. 8 shows characteristics of a nonlinear dielectric constant as a function of the film thickness which is calculated by multiplying the internal electric field average over the layers by nonlinear susceptibility, in which the site dependence is neglected. As understood from the figure, the nonlinear dielectric constant singularly increases at the site where the internal electric field is enhanced resonantly with size.

Therefore, if the sample size area, where the internal electric field singularly enhances, is selected, it is able to obtain a nonlinear optical structure, which has a very large nonlinear optical effect, and can be operated by a weak control light, and be actually used in the optoelectronics field.

In this embodiment, an example of the nonlinear optical structure using CuCl is shown. But, as will be appreciated by those skilled in the art, other material such as CuBr, CdS, CdSe, ZnSe, GaAs and InP can be also used.

Until now, the nonlinear optical effect as described above has not been available. There are mainly three reasons as described below.

The sample size area where the large nonlinear optical effect occurs by confining an electronic system is considered to exist at a very small sample size area compared with the area where the size resonance enhancement of the internal electric field actually occurs. Therefore, nobody has paid any attention to the sample size area described above which is important for the nonlinear optical effect.

Only size dependence of the nonlinear susceptibility has been considered but the size dependence of the internal electric field has not been considered.

Further, with respect to the sample size area as described above, which is important for the nonlinear optical effect, it is considered that there is no enhancement effect of the nonlinear susceptibility by the quantum effect, and a large nonlinear optical effect can not be expected.

In the above explanation, the size resonance enhancement effect of the internal electric field in a thin film shape is described. But, this effect is not restricted by the sample shape. Since this effect occurs by controlling a size of a certain dimension of the sample, a wire shape, box shape, sphere shape other than the thin film described above can be used for obtaining this effect. That is, a very large nonlinear optical effect can be obtained by controlling the width or radius of the quantum wires, quantum boxes or fine particles etc.

Figure 9:
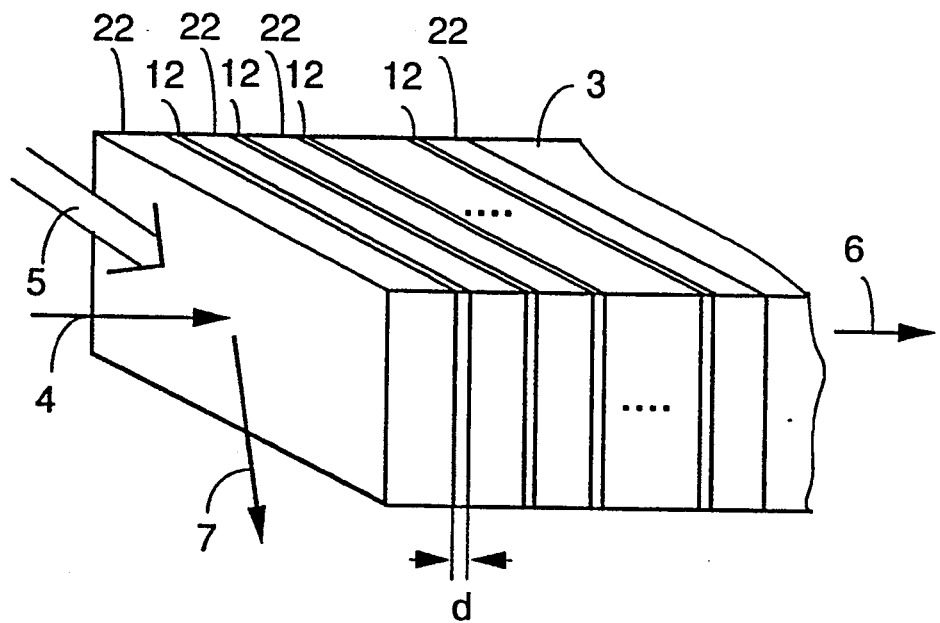
FIG.9 is a conceptual diagram showing a nonlinear optical element of a second embodiment of the present invention.

FIG. 9 is a conceptual diagram showing a nonlinear optical element of a second embodiment of the present invention. In this figure, 12 are active layers. The thickness d of an active layer 12 is selected so that the size resonance enhancement of the internal electric field intensity is generated. 22 are barrier layers. 3 is a substrate. Other numerals are the same as those in FIG. 1.

An optically active layer 12 made of CuCl or ZnSe and a barrier layer 22 are laminated alternatively by epitaxial growth on the substrate 3 and form a super lattice structure. The band gap and thickness of the barrier layer 22 are selected so that electronic state of each optical active layer 12 are separated. The thickness of all optical active layers 12 are selected to be d where the intensity of the electric field of controlling light having exciton resonance energy is enhanced resonantly with size. When the nonlinear optical effect occurs when the transmitted light 6 is used, the substrate 3 must be removed by, for example, an etching method. But, when the nonlinear optical effect which appears in the reflection light 7 is used, the substrate 3 does not need to be removed. As described above, the nonlinear optical effect increases by laminating a plurality of nonlinear optical material alternatively.

Figure 10:
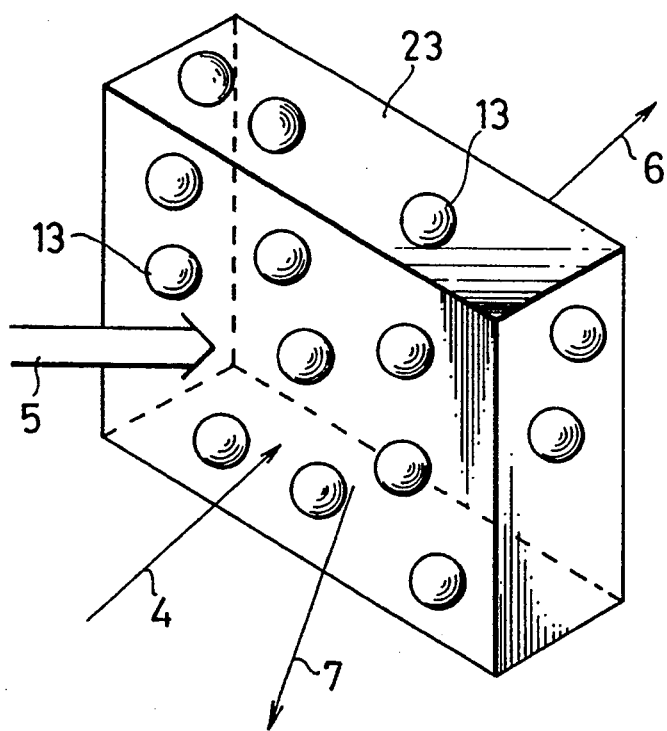
FIG.10 is a conceptual diagram showing a nonlinear optical element of a third embodiment of the present invention.

FIG. 10 is a conceptual diagram showing a nonlinear optical element of a third embodiment of the present invention. In the figure, 13 is a particulate comprised of material showing the nonlinear optical effect. The radius of the particulate 13 is controlled so that the internal electric field intensity is enhanced resonately with size. 23 is a dielectric such as glass, in which the particulates 13 are doped. Other reference numerals for like elements are the same as those in FIG. 1. Many kind of shapes of a nonlinear optical element can be obtained using the above structure.

Figure 11:
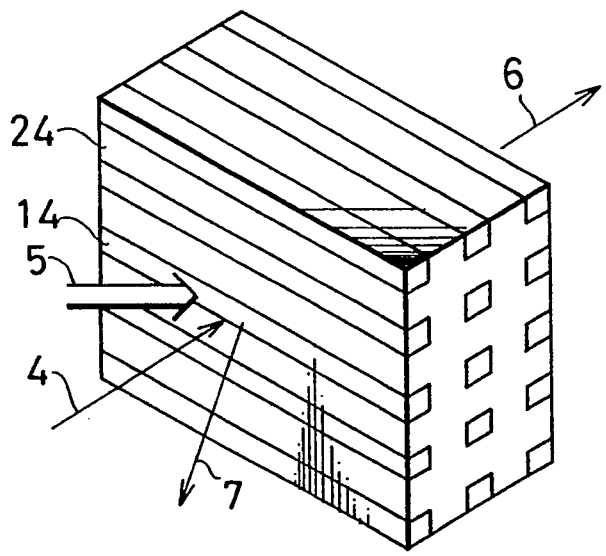
FIG. 11 is a conceptual diagram showing a nonlinear optical element of a fourth embodiment of the present invention.

FIG. 11 is a conceptual diagram showing a nonlinear optical element of a fourth embodiment of the present invention. In the figure, 14 is a quantum wire, comprised of material such as semiconductor showing the nonlinear optical effect. The sample size of the quantum wire 14 is controlled so that the internal electric field intensity is enhanced resonately with size. 24 is a barrier portion. Other reference numerals for like elements are the same as those in FIG. 1. The quantum wire 14 and barrier portions 24 are produced by selective growth of epitaxial layers or by etching.

Figure 12:
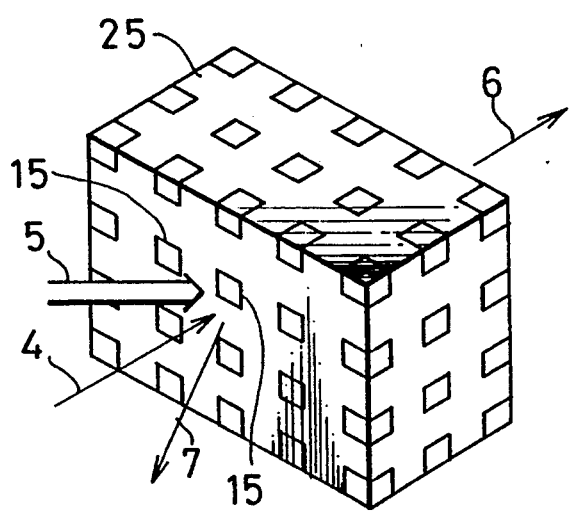
FIG. 12 is a conceptual diagram showing a nonlinear optical element of a fifth embodiment of the present invention.

FIG. 12 is a conceptual diagram showing a nonlinear optical element of a fifth embodiment of the present invention. In the figure, 15 is a quantum box, comprised of material such as semiconductor showing the nonlinear optical effect. The sample size of the quantum box 15 is controlled so that the internal electric field intensity is enhanced resonately with size. 25 is a barrier portion. Other reference numerals for like elements are the same as those in FIG. 1. The quantum boxes 15 and barrier portions 25 are produced by selective growth of epitaxial layers or by etching.

Figure 13:
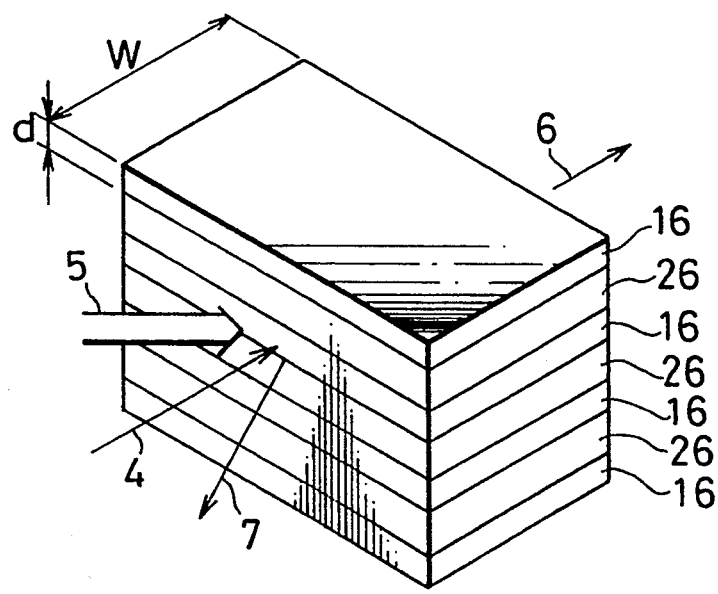
FIG. 13 is a conceptual diagram showing a nonlinear optical element of a sixth embodiment of the present invention.
Figure 14:
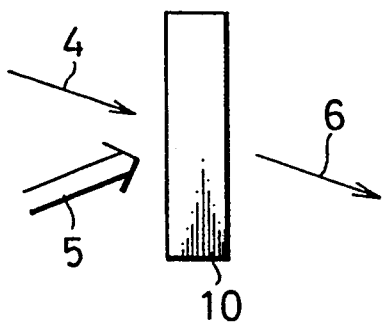
FIG. 14 is a conceptual diagram showing a conventional nonlinear optical element.

FIG. 13 is a conceptual diagram showing a nonlinear optical element of a sixth embodiment of the present invention. In the figure, 16 is a quantum board, comprised of material such as semiconductor showing the nonlinear optical effect. Depth d of the quantum board 16 is controlled so that the relative motion of the Wannier exciton is confined to make two dimensional excitons, and width w is controlled so that center-of-mass motion of the exciton is confined to drive the size resonance enhancement of the internal electric field intensity. 26 is a barrier portion. Other reference numerals for like elements are the same as those in FIG. 1. The quantum board 16 and barrier portion 26 are produced by selective growth of epitaxial layers or by etching. By this structure, a large nonlinear optical effect can be obtained at the room temperature.

The peak value of the internal electric field intensity shown in FIG. 7 is sharper if the LT splitting of the material is larger. That is, although the internal electric field usually considerably attenuates in the material having large LT splitting, it is remarkably enhanced if the internal electric field resonates with the sample size.

Until now, in order to obtain material having a large nonlinear optical effect, material having a large transition dipole moment per atom (M) has been sought. Further, greater effort has been made for enlarging the transition dipole moment M by processing the material into a two dimensional excitonic system. Since, the transition dipole moment M is in proportion to the LT splitting, the material having a large transition dipole moment M has also large LT splitting.

Therefore, in a case of using these materials, this invention has a great advantage because there occurs a large difference according to whether or not one uses the enhancement effect of the internal electric field. In case of the two dimensional excitonic system which confines relative motion of the exciton, the internal electric field is enhanced by confining the center-of-mass motion of the exciton in the remaining degree of freedom.

In the above embodiment, a switch or modulation function which controls the transmission and reflection of signal light by control light is described. These nonlinear optical effects can be applied to other many nonlinear optical elements, such as a four-wave mixing element or optical bistable element.

In the above embodiment, nonlinear optical elements are explained, but they can be also realized by a nonlinear optical structure having the same effect.

Those skilled in the art will recognize that many modifications to the foregoing description can be made without departing from the spirit of the invention. The foregoing description is intended to be exemplary and in no way limiting. The scope of the invention is defined in the appended claims and equivalents thereto.

What is claimed is:

1. A nonlinear optical element for receiving an input light and a control light and producing an output light comprising:

a plurality of quantum members of a predetermined shape which cause a nonlinear optical effect on the output light; and a plurality of barrier portions, each barrier portion separating a quantum member from another quantum member;

wherein the size of each quantum member is selected to be within a specific range such that an internal electric field is maximized, the specific range having a center point approximately equal to a twice when the electric field is at a peak value and the specific range having a width being approximately equal to twice that of the width of a size range when the internal electric field is equal to or greater than half of the peak value.

2. A nonlinear optical element of claim 1 wherein said quantum members are comprised of dielectric samples.

3. A nonlinear optical element of claim 1 wherein said quantum members are comprised of semiconductor samples, 4. A nonlinear optical element of claim 1 wherein said quantum members are comprised of CuCl.

5. A nonlinear optical element of claim 1 wherein said quantum members are comprised of ZnSe.

6. A nonlinear optical element of claim 1 wherein each of the quantum, members is comprised of a thin film shape sample.

7. A nonlinear optical element of claim 1 wherein each of the quantum members is comprised of a sphere shape sample.

8. A nonlinear optical element of claim 1 wherein each of said quantum members is comprised of a bar shape sample.

9. A nonlinear optical element of claim 1 wherein each of the quantum members is comprised of a box shape sample.

10. A nonlinear optical element comprising:
a barrier portion;
a plurality of quantum members embedded in the barrier portion and receiving an input light and a control light and producing an output light having a nonlinear optical effect, wherein the element includes an internal electric field which varies as a function of the size of each quantum member, each quantum member is selected to be within a predetermined size range having a center point approximately equal to a size at which the internal electric field is substantially at a pear value, and the range having a width being 2 times that of a half-peak width, the half-peak width being equal to a size range when the electric field is equal to or greater than half of peak value.

11. A nonlinear optical element comprising:
a barrier portion;
a plurality of quantum members embedded in the barrier potion and receiving an input light and a control light and producing an output light having a nonlinear optical effect, wherein the element has an internal electric field which varies as a function of the size of each quantum member, and wherein the shape of each of the quantum members is such that there are two sizes in two different directions, a first size in a first direction is selected to maximize the internal electric field and a second size in a second direction is selected to quantum-mechanically confine the relative motion of excitons so that oscillator strength and binding energy of excitons in quantum material become larger than those of excitons in non-quantum natural material.

12. A nonlinear optical element comprising:
a barrier member; and
a plurality of optical active members dispersed substantially evenly within the barrier member;
wherein the optical active members cause a nonlinear optical effect, and each optical active member has a predetermined size so that an electric field of exciton resonance energy, which varies as function of the size of the optical active members, in the element is maximized, the size of each optical active member being within a range having a width which is twice that of the width of a size range when the internal electric field is at least as great as half of its peak value.

13. A nonlinear optical element of claim 12 wherein said optical active members are comprised of dielectric samples.

14. A nonlinear optical element of claim 12 wherein said optical active members are comprised of semiconductor samples.

15. A nonlinear optical element of claim 12 wherein said optical active members are comprised of CuCl.

16. A nonlinear optical element of claim 12 wherein said optical active members are comprised of ZnSe.

17. A nonlinear optical element of claim 12 wherein each of said optical active members is comprised of a thin film shape sample.

18. A nonlinear optical element of claim 12 wherein each of said optical active members is comprised of a sphere shape sample.

19. A nonlinear optical element of claim 12 wherein each of said optical active members is comprised of a bar shape sample.

20. A nonlinear optical element of claim 12 wherein each of said optical active members is comprised of a box shape sample.

21. A nonlinear optical element comprising:
a barrier portion;
at least one Optical active member embedded within the barrier portion; and
wherein the optical active member causes a nonlinear optical effect, wherein an internal electric field varies as a function of the size of the quantum member, the quantum member is selected to be within a predetermined size range having a center point approximately equal to a size at which the internal electric field is substantially at a peak value, and the range having a width being 2 times that of a width of a size range of the quantum member when the electric field is equal to or greater than half of the peak value.

22. A nonlinear optical element comprising:
a barrier portion;
a plurality of optical active members dispersed substantially evenly within the substrate; and
wherein the optical active members cause a nonlinear optical effect, and wherein the shape of each of the quantum members is such that there are two sizes in two different directions, a first size in a first direction is selected to maximize the internal electric field and a second size in a second direction is selected to quantum-mechanically confine the relative motion of excitons so that oscillator strength and binding energy of excitons in quantum material become larger than those of excitons in non-quantum natural material.

23. A method for producing a non-linear optical element comprising the steps of:
providing a barrier portion;
embedding a plurality of optical active members substantially evenly within the barrier portion;
wherein each barrier portion separates an optical active member from another optical active member; and
selecting a size of each optical active member to be within a range having a width which is twice the width of a size range of an optical active member when an internal electric field is at least as great as half of its peak value.

24. A method as claimed in claim 23 wherein the step of selecting includes the step of selecting the shape of each optical active member such that each optical active member is in the shape of a bar.

25. A method as claimed in claim 23 wherein the step of selecting includes the step of selecting the shape of each optical active member such that each optical active member is in the shape of a box.

* * * * *